United States Patent
Tamura et al.

(10) Patent No.: US 7,252,314 B2
(45) Date of Patent: Aug. 7, 2007

(54) CRASH ENERGY ABSORPTION MEMBER

(75) Inventors: Kenji Tamura, Takatsuki (JP);
Yoshiaki Nakazawa, Takarazuka (JP);
Michitaka Yoshida, Amagasaki (JP);
Katsutoshi Takagi, Aichi (JP);
Mitsutoshi Kano, Toyota (JP)

(73) Assignees: Sumitomo Metal Industries, Ltd., Osaka (JP); Toyoda Iron Works Co., Ltd., Aichi (JP)

( * ) Notice: Subject to any disclaimer, the term of this patent is extended or adjusted under 35 U.S.C. 154(b) by 0 days.

(21) Appl. No.: 11/340,663

(22) Filed: Jan. 27, 2006

(65) Prior Publication Data

US 2006/0202493 A1 Sep. 14, 2006

Related U.S. Application Data

(63) Continuation of application No. PCT/JP2004/011118, filed on Jul. 28, 2004.

(30) Foreign Application Priority Data

Jul. 28, 2003 (JP) .............................. 2003-280949

(51) Int. Cl.
*B60R 19/34* (2006.01)
(52) U.S. Cl. .................................. 293/133; 296/187.09
(58) Field of Classification Search ........... 296/187.09, 296/187.03, 205, 203.02; 293/132, 133, 293/154
See application file for complete search history.

(56) References Cited

U.S. PATENT DOCUMENTS

2005/0057053 A1* 3/2005 Evans et al. ................. 293/133
2005/0151392 A1* 7/2005 Yasukouchi et al. ... 296/187.03
2006/0033363 A1* 2/2006 Hillekes et al. ........ 296/187.09

FOREIGN PATENT DOCUMENTS

| JP | 60-6674 | 1/1985 |
|---|---|---|
| JP | 05-116645 | 5/1993 |
| JP | 06-123323 | 5/1994 |
| JP | 07-025353 | 1/1995 |
| JP | 08-108863 | 4/1996 |
| JP | 08-128487 | 5/1996 |
| JP | 09-060676 | 3/1997 |
| JP | 09-277953 | 10/1997 |
| JP | 2002-284033 | 10/2002 |
| JP | 2003-284033 | 10/2002 |
| JP | 2003-048569 | 2/2003 |

* cited by examiner

Primary Examiner—Jason Morrow
(74) Attorney, Agent, or Firm—Clark & Brody

(57) ABSTRACT

A crash energy absorption member formed from a tubular body for absorbing impact energy by buckling when it receives an impact load in the axial direction from one end in the axial direction. It has a transverse cross-sectional shape along at least a portion in the axial direction which is a closed cross section having a plurality of vertices in which there is no flange on the outside of the closed cross section, and in a region of at least one side of a basic cross section formed from the largest outline obtained by connecting a portion of the plurality of vertices by straight lines, a groove which is recessed towards the inside of the outline is provided in a location other than at an end point of the side. Thus, the crash energy absorption member can achieve a prescribed amount of shock absorption by stably buckling in the axial direction without bending and without an increase in weight due to the addition of a partition or due to an increase in plate thickness.

14 Claims, 7 Drawing Sheets

US 7,252,314 B2

CRASH ENERGY ABSORPTION MEMBER

CROSS REFERENCES TO RELATED APPLICATIONS

This application is a continuation of International Patent Application No. PCT/JP2004/011118, filed Jul. 28, 2004. This PCT application was not in English as published under PCT Article 21(2).

TECHNICAL FIELD

This invention relates to a crash energy absorption member. Specifically, this invention relates to a crash energy absorption member which can absorb impact energy which is generated at the time of a collision of a vehicle such as an automobile.

BACKGROUND ART

As is well known, at present, the bodies of many automobiles are monocoque bodies in which a load is supported by the overall body which is integral with a frame in order to achieve both a decrease in weight and high stiffness. The body of an automobile must be able to suppress impairment of the functions of the vehicle at the time of a collision of the vehicle and protect the lives of passengers within a passenger cabin. In order to decrease damage to a passenger cabin by absorbing the energy of impact at the time of a collision of a vehicle and reduce the impact force to the passenger cabin, it is advantageous to preferentially crash spaces other than the passenger cabin, such as the engine compartment or the trunk.

On account of such safety demands, crash energy absorption members which actively absorb impact energy by collapsing when an impact load is applied at the time of a collision are provided in suitable locations, such as at the front, the rear, or the side of a vehicle. Examples of such crash energy absorption members are cross side members, side sills, and rear side members.

In recent years, it has been attempted to increase the safety of vehicles and to reduce repair costs by nearly eliminating damage to vehicles caused by light impacts by mounting a crash energy absorption member referred to as a crash box on the front end of a front side member by a suitable means such as joining with a connector or welding. A crash box is a member which absorbs impact energy by preferentially buckling in the axial direction into the shape of a bellows (accordion) under an impact load which is applied in the axial direction (in this specification, this means the lengthwise direction of a crash energy absorption member).

Various materials and shapes have thus far been developed for increasing the crash energy absorbing performance of such a crash energy absorption member. The crash energy absorbing performance which is demanded of a crash energy absorption member are, specifically, that it deform into a bellows shape by repeatedly stably buckling in the axial direction when an impact load is applied in the axial direction, that the average load be high at the time of collapse of the crash energy absorption member, and that the largest reaction force which is generated upon the collapse of the crash energy absorption member be within a range which does not cause damage to other members disposed in the vicinity of the crash energy absorption member.

Up to now, crash energy absorption members which have generally been used have been box-shaped members welded to a backing plate by means of a flange provided on a member having a hat-shaped transverse cross-sectional shape like that disclosed in JP-A 08-128487, for example. In this specification, "flange" means an edge portion which projects outwards from an outline of a transverse cross section.

In contrast, in JP-A 09-277953, an invention pertaining to a crash energy absorption member is disclosed which decreases the load at the initial stage of a collision and increases the absorbed impact by having a closed cross-sectional structure such that the transverse cross-sectional shape continuously changes from one end towards the other end from a polygon having at least 4 sides to a polygon having a larger number of sides.

JP-A 2003-48569 discloses an invention pertaining to a crash energy absorption member which has a polygonal closed cross-sectional shape with a partition in its interior.

JP-A 2002-284033 discloses an invention pertaining to a crash energy absorption member which secures strength by forming a groove with a generally right triangle shape facing towards the interior in a region including each of 4 vertices of a material having a rectangular transverse cross section.

In addition, JP-A 08-108863 discloses an invention which forms a bead which extends in the axial direction on the side surface of a front side frame having a hat-shaped cross section with a flange in order to suppress bending of the front side frame when an impact load is applied.

However, in any of these existing inventions, a crash energy absorption member cannot be provided which can secure a prescribed amount of shock absorption by stable buckling in the axial direction without leading to an increase in weight due to the addition of a partition or an increase in plate thickness.

The transverse cross-sectional shape of crash energy absorption members used in the bodies of automobiles is in almost all cases flat. Therefore, it is difficult to use a crash energy absorption member having a polygonal transverse cross-sectional shape such as a simple regular polygon as disclosed in JP-A 09-277953. In the invention disclosed in JP-A 09-277953, the transverse cross-sectional shape of the crash energy absorption member gradually changes over approximately its entire length. Therefore, in some positions in the axial direction, the transverse cross-sectional shape of the crash energy absorption member may unavoidably become a shape which is not suitable for stable buckling. Accordingly, when an impact load is applied in the axial direction, that crash energy absorption member cannot stably repeatedly buckle in the axial direction, and it may not deform into a bellows shape.

In the invention disclosed in JP-A 2003-48569, there is the possibility of the strength of the portion in which a partition is provided increasing too much. Therefore, in that invention, buckling may become unstable and the amount of shock absorption may become insufficient. There is also the possibility of the largest reaction force which is generated in the crash energy absorption member, particularly in the initial stage of collapse, exceeding the strength of other members and of the other members collapsing before the crash energy absorption member collapses. In addition, in that invention, the weight of the crash energy absorption member unavoidably increases by an amount corresponding to the partition provided in its interior. Therefore, that invention is contrary to the trend towards decreasing the weight of vehicle bodies, for which there has been a particularly strong desire in recent years.

In the invention disclosed in JP-A 2002-284033, corner portions which inherently have a high strength undergo further working to form a notch therein. As a result, the strength of the notch may increase too much, and it may become impossible for stable buckling to take place. Accordingly, in that invention, in the same manner as in the invention disclosed in JP-A 2003-48569, the amount of shock absorption may be insufficient, and other members may collapse before the crash energy absorption member collapses.

In the invention disclosed in JP-A 08-108863, a crash energy absorption member has a hat-shaped transverse cross-sectional shape with a flange. According to that invention, it is thought that it is indeed possible to suppress bending due to an impact load applied thereto. However, according to that invention, when an impact load is applied, it cannot stably collapse in the axial direction into a bellows shape.

An object of the present invention is to provide a crash energy absorption member which can secure a prescribed amount of shock absorption by stably buckling in the axial direction into the shape of a bellows when an impact load is applied thereto without an increase in weight due to the addition of a partition or an increase in plate thickness and without causing bending in the axial direction.

DISCLOSURE OF THE INVENTION

The present inventors performed various studies in light of the problems of the above-described prior art, and as a result, they made the new and important findings (I) and (II) described below and thereby completed the present invention.

(I) By providing a crash energy absorption member with a transverse cross-sectional shape which satisfies all the following conditions (a) to (c), namely, (a) forming a closed cross section having a generally polygonal shape, (b) having no outwardly extending flange, and (c) having a groove in a region of at least one side of a basic cross section in a location not at an end point of the side, with the groove being recessed towards the interior of the basic cross section, the basic cross section being defined as the polygon having the largest area of the polygons obtained by connecting with straight lines some of a plurality of vertices constituting a generally polygonal shape, even in the case of a flat transverse cross-sectional shape which is frequently used in actual crash energy absorption members, a prescribed crash energy absorbing performance can be secured due to stable buckling in the axial direction into the shape of a bellows without leading to an increase in weight due to the addition of a partition or an increase in plate thickness and without causing bending deformation in the axial direction.

(II) As a result of diligent investigations by FEM analysis, it was found that there exist suitable conditions for the shapes of the groove which should be selected in order to stabilize buckling. If these conditions are deviated from, buckling behavior becomes unstable, and there is the possibility of crash energy absorbing performance decreasing.

The present invention is a crash energy absorption member formed from a tubular body for absorbing impact energy by buckling when it receives an impact load applied in the axial direction from one end of the tubular body in the axial direction, characterized in that it has a transverse cross-sectional shape along at least a portion in the axial direction which is a closed cross section having a generally polygonal shape in which there is no flange on the outside of the closed cross section and in a region of at least one side of a basic cross section defined as the polygon having the largest area of the polygons obtained by connecting with straight lines a portion of a plurality of vertices constituting the generally polygonal shape, a groove which is recessed towards the inside of the basic cross section is provided in a location not at an end point of the side, and the remaining regions other than the region of the side having the groove are formed with a generally straight shape and preferably as straight lines.

In a crash energy absorption member according to the present invention, when the width of a side having one or more grooves is a, the width of the opening in one groove is $W_i$, the plate thickness of the crash energy absorption member is t, the number of grooves provided in the side is n, and the width of one of the remaining (n+1) regions which are separated by the n grooves provided in the side is $X_j$, then the grooves preferably satisfies the following Equations (1) and (2).

$$4t < W_i < 65t \quad i = \text{a natural number from 1 to n} \quad (1)$$

$$4t < X_j < 65t \quad j = \text{a natural number from 1 to (n+1)} \quad (2)$$

Here, $\Sigma W_i + \Sigma X_j = a$, wherein $\Sigma W_i$ is the sum of the opening widths $W_i$ of the grooves formed in the side of width a. The width of the opening of a groove is the distance between two intersections between the side of width a and the outline of the groove. $\Sigma X_j$ is the sum of the widths $X_j$.

In a crash energy absorption member according to the present invention, when the total length in the axial direction of the crash energy absorption member is T, preferably (a) a groove is provided in a region extending from a position separated from one end by a distance (T×0.3) in the axial direction to the other end, or (b) the transverse cross-sectional area of the crash energy absorption member is smaller in at least a portion of a region from one end to a location separated therefrom in the axial direction by a distance of (T×0.3) than in other locations.

In a crash energy absorption member according to the present invention, the internal angle (α) at an intersection between a side of width a having at least one groove and the outline of the groove is preferably greater than or equal to the internal angle (β) at an end of the side.

In a crash energy absorption member according to the present invention, the cross-sectional shape of the groove is preferably a trapezoid, a curved shape, a triangle, a quadrilateral, or a shape which is a combination of two or more of these shapes.

In addition, when a crash energy absorption member according to the present invention receives a load, it buckles into a bellows shape due to the groove and the remaining regions alternatingly deforming in opposite directions.

BRIEF DESCRIPTION OF THE DRAWINGS

FIG. 1 is an explanatory view showing the collapsed state of a crash energy absorption member having a rectangular transverse cross section according to FEM numerical analysis.

FIG. 5 is an explanatory view showing a case in which three grooves are provided in a side having a length a.

FIG. 13(*a*) shows the case in which an outwards curvature is imparted, and FIG. 13(*b*) shows the case in which an inwards curvature is imparted.

EXPLANATION OF EMBODIMENTS OF THE INVENTION

First Embodiment

Figure 1A:
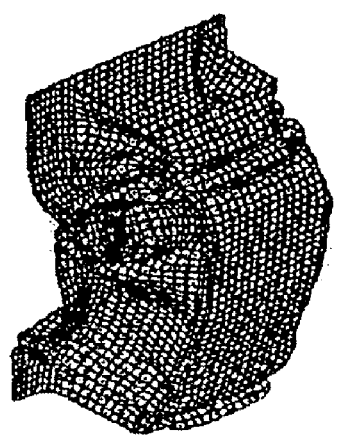
FIG. 1(a) shows the case in which a flange is provided.

Next, best modes for carrying out a crash energy absorption member according to the present invention will be described in detail while referring to the attached drawings. In an explanation of this first embodiment, an example will be given of the case in which in a transverse cross section, in a region of at least one side of a basic cross section defined as the polygon having the largest area of polygons obtained by connecting with straight lines some of a plurality of vertices forming a generally polygonal shape having a closed cross section, a groove having a shape recessed towards the interior of the outline of the basic cross section is provided in a location other than at an end point of the side, and remaining regions other than the region of the side are formed as straight lines.

The crash energy absorption member of this embodiment is one which receives an impact load which is applied in the axial direction and absorbs impact energy by buckling into a bellows shape. The transverse cross-sectional shape of at least a portion thereof in the axial direction is a closed cross section which has a plurality of vertices which form a generally polygonal shape, and it does not have a flange extending outwards from the closed cross section. The transverse cross-sectional shape of at least a portion in the axial direction is one in which in a region of at least one side of a basic cross section defined as the polygon having the largest area of polygons obtained by connecting with straight lines some of a plurality of vertices forming a generally polygonal shape, a groove which is to recessed towards the interior of the outline of the basic cross section is provided in a location not at an end point of the side.

Namely, in this embodiment, the transverse cross-sectional shape of a crash energy absorption member is made a shape having each of the following 3 elements (i)-(iii): (i) it is a closed cross section having a generally polygonal shape, (ii) it does not have a flange extending towards the outside of the closed cross section, and (iii) in a region of at least one side of a basic cross section defined as the polygonal having the largest area of polygons obtained by connecting with straight lines some of a plurality of a vertices forming the generally polygonal shape, a groove which is recessed towards the interior of the outline of the basic cross section is formed in a location which is not at an end point of the side.

As a result, even though the crash energy absorption member has a flat transverse cross-sectional shape, when all impact load is applied, a prescribed crash energy absorbing performance by stably buckling in the axial direction into the shape of a bellows is secured without an increase in weight due to the addition of a partition or an increase in plate thickness and without causing bending in the axial direction. The principles of a crash energy absorption member of this embodiment will be explained.

An explanation will be given with respect to crash energy absorption members having a length of 200 mm and made from a steel sheet having a thickness of 1.6 mm and a strength on the order of 590 MPa. The transverse cross-sectional shape of the crash energy absorption members was a polygon having (a) the shape of a rectangle having long sides with a length of 80 mm and short sides with a length of 60 mm or the shape of a regular octagon with the length of each side being 35 mm, (b) it did not have an outwardly extending flange, and (c) it had trapezoidal grooves. The regular octagon was changed into octagons having various degrees of flatness by elongating two opposing sides. The effects of the shape of the grooves on buckling stability were investigated by carrying out FEM numerical analysis on these crash energy absorption members. As a result, the following principles (Principle 1-Principle 3) of a crash energy absorption member of this embodiment were derived.

Principle 1—The behavior during collapse at the time of application of an impact load was analyzed by FEM numerical analysis for a crash energy absorption member having a flange which serves as a location for joining by spot welding or the like at least two members formed by press forming or the like, and for a crash energy absorption member not having this flange.

Figure 1B:
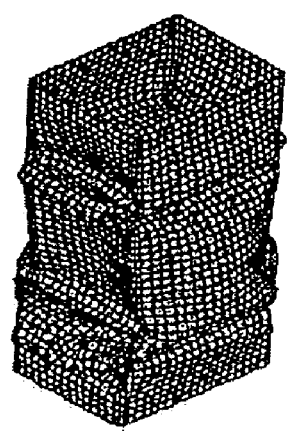
FIG. 1(b) shows the case in which a flange is not provided.

FIG. 1 is an explanatory view showing the state of collapse obtained by FEM numerical analysis of a crash energy absorption member having a rectangular transverse cross-sectional shape. FIG. 1(*a*) shows the case in which it has a flange, and FIG. 1(*b*) shows the case in which it does not have a flange.

As shown in FIG. 1(*a*), when the crash energy absorption member has a flange, the buckling which develops in the crash energy absorption member when an impact load is applied becomes extremely unstable, and during collapse, the crash energy absorption member bends in the lengthwise direction. In contrast, as shown in FIG. 1(*b*), in a crash energy absorption member which does not have a flange, the crash energy absorption member stably buckles into the shape of a bellows without bending in the lengthwise direction.

Figure 2:
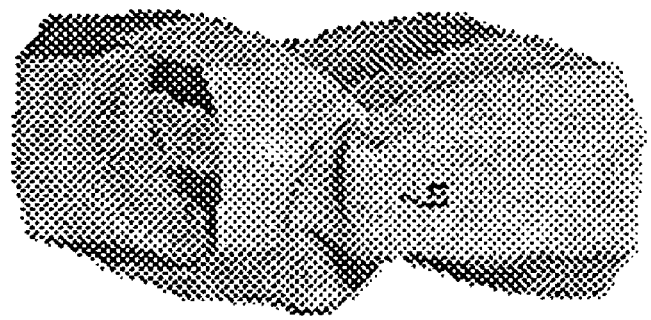
FIG. 2 is an explanatory view showing the collapsed state of a flat octagonal shape obtained by gradually increasing the lengths of two opposing sides of a regular octagon.

Principle 2—Using a crash energy absorption member having a transverse cross-sectional shape that was a regular octagon, the lengths of two opposing sides were gradually increased to change from a regular octagon to an octagon having a flattened shape. FIG. 2 shows the state of collapse thereof. As the degree of flatness increases, buckling at the time of collapse becomes less stable and forms a complicated shape, and buckling at the time of collapse gradually becomes unstable.

Principle 3—Buckling can be made stable by providing a groove in a long side of a flat octagon for which buckling is unstable.

Figure 3:
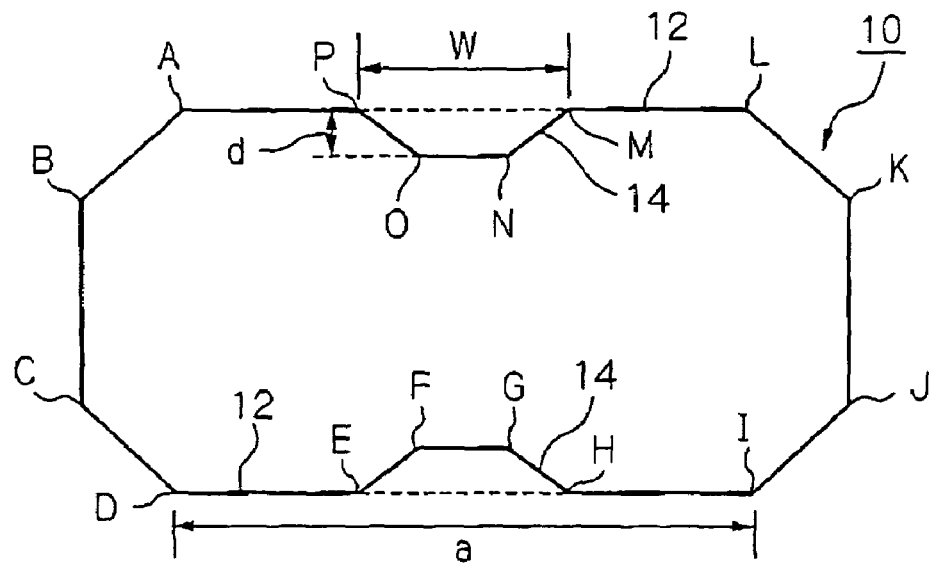
FIG. 3 is an explanatory view showing a case in which a trapezoidal groove is provided in a portion of each long side of a crash energy absorption member having a flat octagonal transverse cross section.

FIG. 3 is an explanatory view showing the state in which a trapezoidal groove 14 is provided in a portion of a long side 12 of a crash energy absorption member 10 having a transverse cross-sectional shape which is a flat octagon. In this example, two grooves 14 each have a width W and a depth d and are symmetrically provided.

If the transverse cross-sectional shape of the crash energy absorption member 10 has the shape shown in FIG. 3, or specifically it has a shape with all of the three elements (i)-(iii), namely, (i) it has a closed cross section having a plurality of vertices A-P which form a generally polygonal shape, (ii) it does not have a flange extending towards the outside of this closed cross section, and (iii) a groove 14 which is recessed towards the interior of a basic cross section (geometric figure A-B-C-D-I-J-K-L-A in FIG. 3) defined as the polygon having the largest area of polygons obtained by connecting some of the plurality of vertices A-P with straight lines is formed in a region of side 12 (A-L) and side 12 (D-I) making up this basic cross section in a location not including any of vertices A, D, I, and L, a crash energy absorbing ability can be exhibited such that stable buckling takes place and the crash energy absorption member 10 buckles into the shape of a bellows. Namely, when the crash energy absorption member 10 receives an impact load and buckles, the grooves 14 and the remaining straight line portions which are separated by the grooves 14 are alternatingly deformed, and they buckle into a bellows shape.

Based on an overall consideration of the results of the above-described FEM numerical analysis, the mechanism by which the crash energy absorption member 10 of this embodiment provides this excellent effect is thought to be as follows.

The grooves 14 provided in sides 12 are recessed towards the inside of the above-described basic cross section (geometric figure A-B-C-D-I-J-K-L-A in FIG. 3). Therefore, when an impact load is applied, the displacement of the grooves 14, 14 is towards the inside of geometric figure A-B-C-D-I-J-K-L-A.

In contrast, the displacement of vertices A, B, C, D, I, J, K, and L which constitute the basic cross section (geometric figure A-B-C-D-I-J-K-L-A) is in a direction towards the outside of geometric figure A-B-C-D-I-J-K-L-A.

Therefore, the direction of displacement of grooves 14, 14 and the direction of displacement of vertices A, B, C, D, I, J, K, and L are mutually opposite, and their displacements in the cross section cancel each other.

As a result, during buckling of the crash energy absorption member 10, it is difficult for a large collapse in the form of bending in one direction to take place. In addition, the time at which buckling occurs in the grooves 14 is different from the time at which buckling occurs at each of the vertices A-P. Therefore, the buckling behavior is stable.

Favorable conditions for the formation of the groove 14 were investigated by FEM analysis. In this investigation, FEM analysis at the time of collapse was carried out for a square, a regular hexagon, a regular octagon, and a regular decagon, and a suitable range for the lengths of the sides constituting each polygon was investigated.

Figure 4:
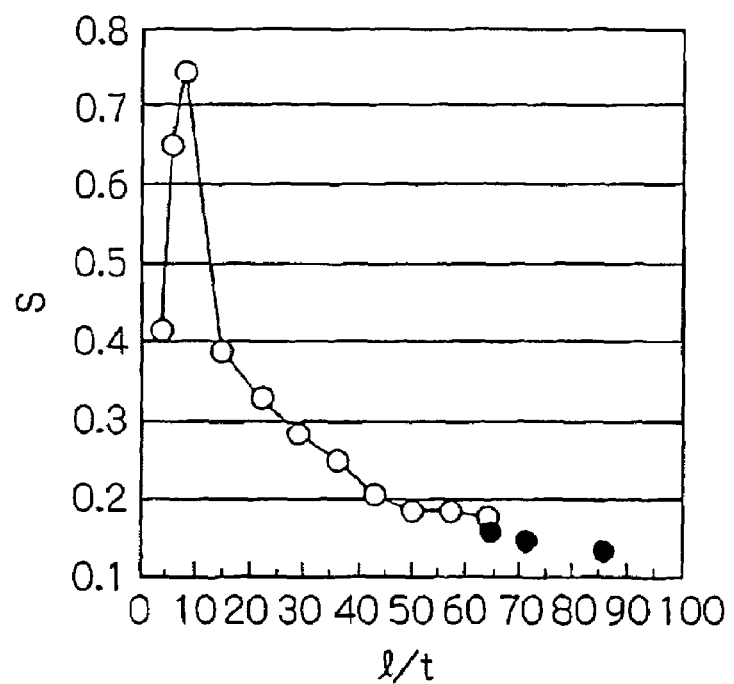
FIG. 4 is a graph showing the results of FEM analysis.

The results of FEM analysis are shown in the graph of FIG. 4. The abscissa in the graph of FIG. 4 indicates the ratio $l/t$ (l: length of a side; t: plate thickness), and the ordinate S indicates the average load (kN/mm) per unit cross-sectional circumferential length at the time of 70% collapse.

As shown in the graph of FIG. 4, if the length l of one side with respect to the plate thickness t is in a range satisfying $4 < (l/t) < 65$, stable deformation is obtained regardless of the number of sides in a polygon, and stable crash energy absorbing performance is secured. Namely, in the graph shown in FIG. 4, if (l/t) is a value of 3.6 which is slightly lower than 4, bending develops without the crash energy absorption member 10 buckling into the shape of a bellows, and there are cases in which energy absorption can no longer be secured. On the other hand, if (l/t) is a value of 4.7 which is slightly greater than 4, buckling in a desirable bellows shape is obtained without producing bending of the crash energy absorption member 10, and absorption of energy can be adequately secured.

In the graph shown in the same figure, if (l/t) has a value of 64 which is slightly less than 65, bellows-shaped buckling is obtained and the absorption of energy can be adequately secured. On the other hand, if (l/t) is greater than or equal to 65, bending of the entire crash energy absorption member 10 develops, so the amount of absorbed energy decreases.

From the above results, when the width of a side having this groove 14 is a, the width of the opening of one groove 14 is Wi, the plate thickness of the crash energy absorption member 10 is t, the number of grooves 14 provided in the side is n, and the width of one of the (n+1) remaining regions (sections) separated by the n grooves 14 in the side of width a is Xj, then the groove 14 preferably satisfies below-described Equations 1 and 2:

$$4t < Wi < 65t \quad i = \text{a natural number from 1 to n} \quad (1)$$

$$4t < Xj < 65t \quad j = \text{a natural number from 1 to (n+1)} \quad (2)$$

$\Sigma Wi + \Sigma Xj = a$, wherein $\Sigma Wi$ is the sum of the opening widths Wi of the grooves formed in the side of width a, the width of the opening of a groove is the distance along the side of width a between the two intersections of the outline of the groove with this side, and $\Sigma Xj$ is the sum of the above-described widths Xj.

More preferably, the following equations are satisfied so as to markedly increase the average load, as shown in the graph of FIG. 4:

$$4t < Wi < 35t \quad i = \text{a natural number from 1 to n} \quad (1a)$$

$$4t < Xj < 35t \quad j = \text{a natural number from 1 to (n+1)} \quad (2a)$$

When the depth d of a groove 14 becomes less than 0.3 times the opening width Wi of the groove 14, the strength of the groove 14 becomes low compared to the strength of the other vertices which do not form the groove 14, and it is easy for buckling to become unstable. Therefore, the depth d of a groove 14 is preferably at least 0.3 times the opening width Wi of the groove 14.

Thus, when the plate thickness of the crash energy absorption member 10 is t, the opening width Wi of one groove 14 satisfies 4t<Wi<65t. When Wi is less than or equal to 4t, the strength of the groove with respect to buckling becomes too high compared other vertices A, B, C, D, I, J, K, and L which form a polygon, and buckling instabilities such as bending during collapse may occur. On the other hand, if Wi is greater than or equal to 65t, the effect of the groove 14 may decrease. This relationship is satisfied for each of the n grooves.

In this embodiment, a groove 14 may be present in any of the sides of a polygon, and there may be two or more grooves in one side. However, if a groove 14 is provided in a location including any of the vertices A, B, C, D, I, J, K, and L of the basic cross section, in the same manner as in the invention described in above-mentioned JP-A 2002-284033, the strength of that vertex excessively increases. As a result, buckling becomes unstable, and there is the possibility of the amount of shock absorption being insufficient. In addition, particularly in the initial stage of collapse, there is the possibility of the largest reaction force produced in the crash energy absorption member 10 exceeding the strength of other members and of the other members being damaged.

Next, the remaining regions excluding the regions in which a groove 14 is formed will be described.

In FIG. 3, when n grooves 14 are provided in a side 12, the side is divided by the grooves 14 into (n+1) new straight line portions. If the width of each of the (n+1) straight line portions which are separated in this manner is Xj, then Equation 2 is satisfied.

$$4t < X_j < 65t \quad j = \text{a natural number from 1 to (n+1)} \quad (2)$$

When this width Xj is less than or equal to 4t or greater than or equal to 65t, sufficient energy absorption is not obtained.

Figure 5:
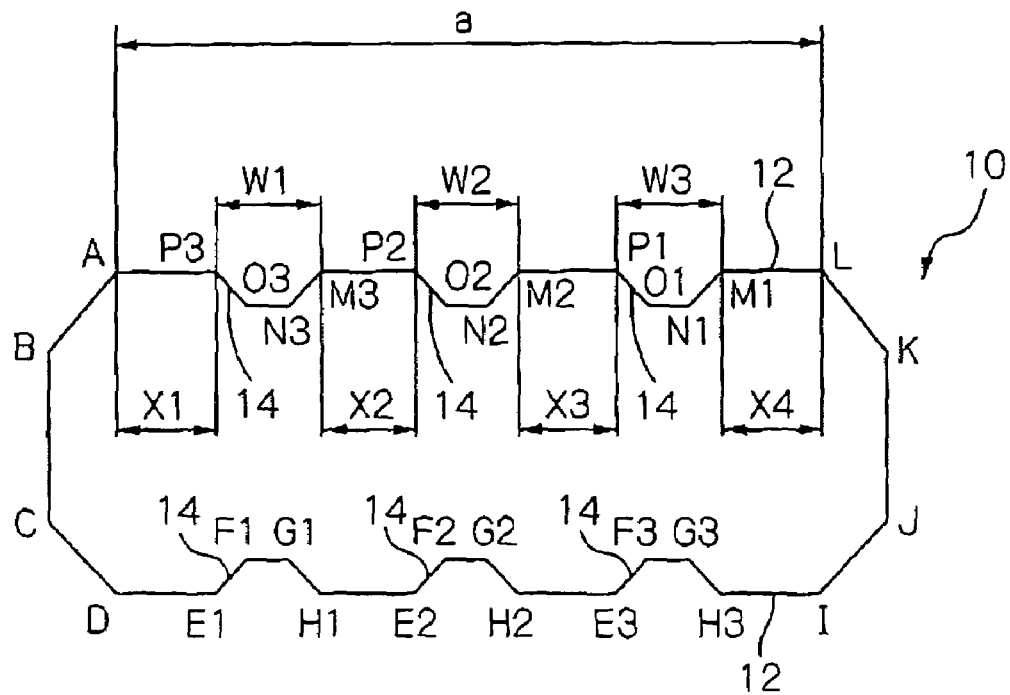

These relationships are shown concretely in FIG. 5. In FIG. 5, three grooves 14 are provided in a side 12 having a width a. The opening widths W1, W2, and W3 of the grooves 14 are each greater than 4 times the plate thickness t and smaller than 65 times the plate thickness t. At the same time, the widths X1, X2, X3, and X4 of the four remaining straight line portions into which the side 12 of width a is divided are each greater than 4 times the plate thickness t and less than 65 times the plate thickness t.

In the above explanation, an example is given of an embodiment in which the transverse cross-sectional shape of the groove 14 is trapezoidal. However, the present invention is not limited to this embodiment. It is also possible for the transverse cross-sectional shape of the groove to be a curved shape, a triangle, a quadrilateral, or a shape which is a combination of two or more of these shapes.

Figure 6A:
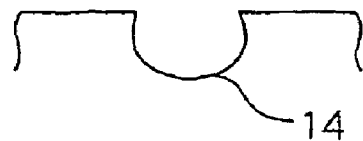
FIGS. 6(*a*)-6(*d*) are explanatory views showing several examples of cross-sectional shapes of a groove.
Figure 6B:
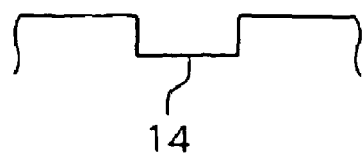
Figure 6C:
Figure 6D:

The shape of the bottom portion of the groove 14 need not be a flat surface. A number of examples of cross-sectional shapes of the groove 14 are shown in FIGS. 6(a)-6(d). FIG. 6(a) shows a case in which it is formed into a shape having an arc. FIG. 6(b) shows a case in which it is formed into a rectangular shape. FIG. 6(c) shows a case in which it is formed into a triangular shape. FIG. 6(d) shows a case in which it is formed into a shape which is a combination of a portion of a triangle and an arc.

Figure 7:
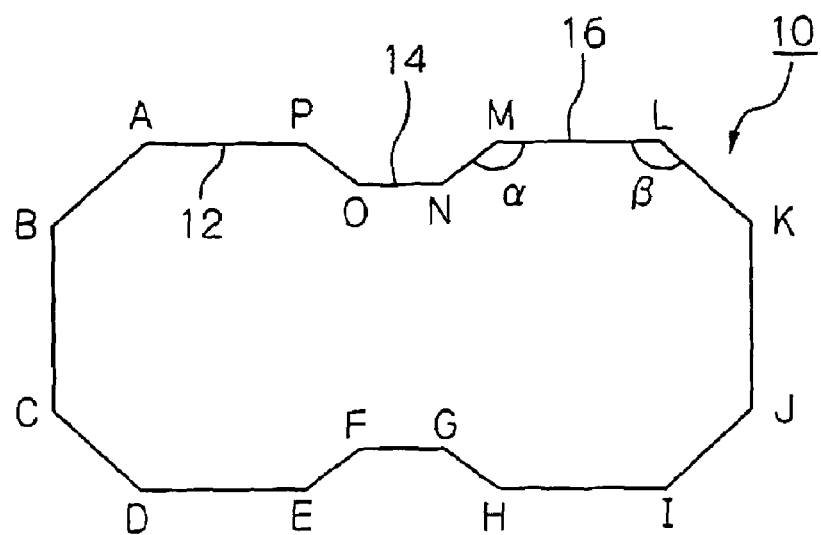
FIG. 7 is an explanatory view showing an example of the shape of a groove provided in a portion of each long side of a crash energy absorption member having a flat octagonal cross section.

FIG. 7 is a figure which is similar to FIG. 3, and the same symbols indicate the same parts.

In this embodiment, as shown in FIG. 7, the internal angle α at the intersection M between the outline of the groove 14 and a side is preferably greater than or equal to the internal angle β at the end point L of the side. Namely, in FIG. 7, α is preferably greater than or equal to β. If α is less than β, the strength of the groove 14 exceeds the strength of the vertices A, D, I, and L of the basic cross section, and buckling can easily become unstable.

The crash energy absorption member 10 of this embodiment can secure sufficient energy absorption, but there are cases in which the initial load at the time of the start of collapse becomes high and causes problems. As a result, depending upon the relationship with other members, there is a possibility of damage to other members due to a high initial largest load. Therefore, in this embodiment, in order to decrease the initial largest load, when the overall length in the axial direction of the crash energy absorption member 10 is T, the transverse cross-sectional area of the crash energy absorption member in a region from one end to a position spaced from the end by a distance (T×0.3) is made smaller than in the other portions. For example, in at least a portion of a region from one end to a position spaced therefrom in the axial direction by a distance (T×0.3), the transverse cross-sectional area gradually decreases in the direction of from the position spaced by a distance (T×0.3) towards the one end 15.

Next, the relationship between the length in the axial direction in which the transverse cross-sectional area decreases and the effect of decreasing the initial largest load will be explained.

Figure 8:
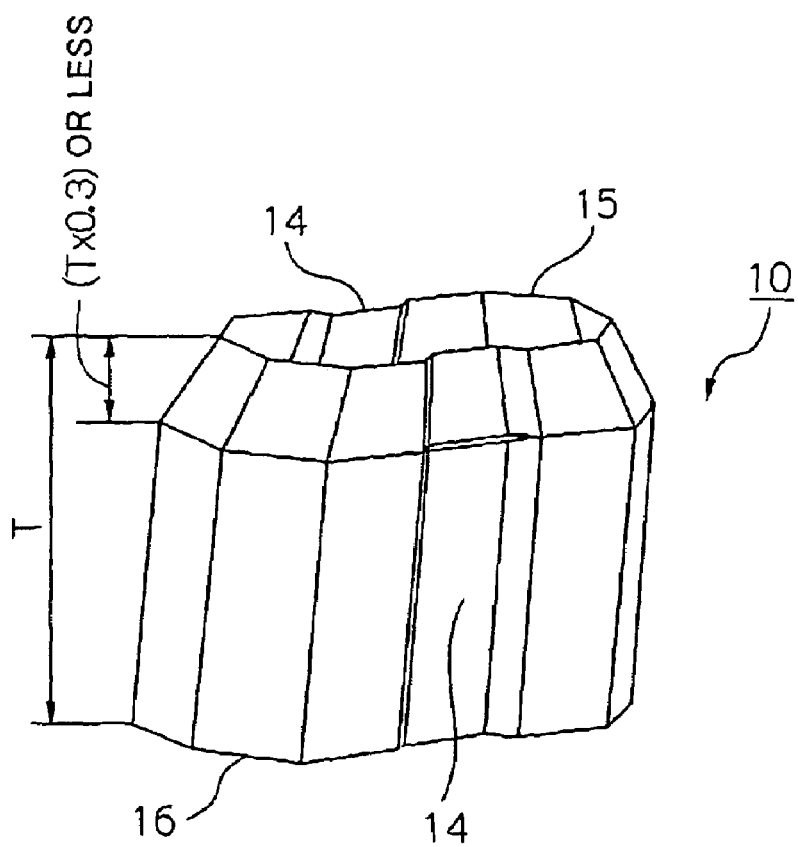
FIG. 8 is an explanatory view showing an example of the shape of a lengthwise end portion of a crash energy absorption member.

FIG. 8 is an explanatory view showing a crash energy absorption member 10 of this embodiment. In this figure, a groove 14 having an opening width W of 37.5t is provided in a tubular body with an octagonal cross section having a flatness of 2.0 and an overall length of T to form a crash energy absorption member. In this example, the transverse cross-sectional area at one end 15 where an impact load is applied is made 60% of the transverse cross-sectional area at the other end 16. In a region from the one end 15 up to a length of at most (T×0.3), the transverse cross-sectional area gradually increases, and the transverse cross-sectional area at locations outside of this region is the same as the transverse cross-sectional area at the other end 16. The magnitude of the initial largest load was studied by an analysis under such conditions that the member was collapsed in the axial direction by 70% of its length.

Figure 9:
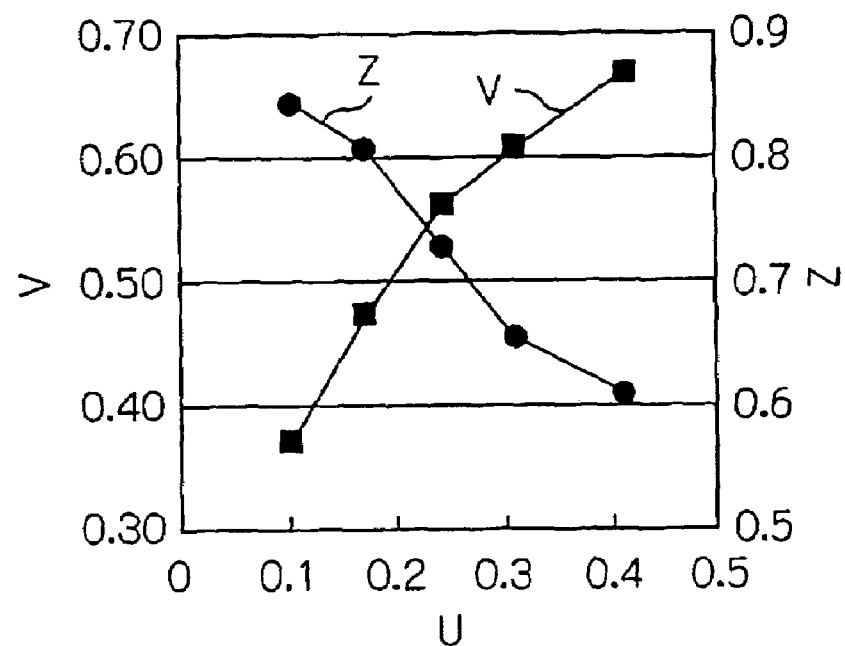
FIG. 9 is a graph showing the results of a first embodiment.

Results of the investigation are shown in the graph of FIG. 9. The abscissa U in the graph of FIG. 9 indicates the length of the portion in which the cross-sectional area decreases divided by the length of the member T. The ordinate V on the left side indicates the initial largest load ratio (which is 1 in the case in which the cross-sectional area does not decrease) and the ordinate Z on the right side indicates the absorbed energy ratio at the time of 70% collapse (which is 1 when the cross-sectional area does not decrease). In the graph of FIG. 9, the black squares indicate the initial largest load ratio, and the black circles indicate the absorbed energy ratio.

As shown in the graph of FIG. 9, compared to the case in which the cross-sectional area of one end 15 does not decrease, by gradually decreasing the cross-sectional area from a prescribed position towards the one end 15 in at least a portion of the region from the one end 15 to a position separated therefrom in the axial direction by a distance (T×0.3), an effect of decreasing the initial largest load is obtained, and a large decrease in the amount of impact energy which is absorbed can be suppressed.

Figure 10:
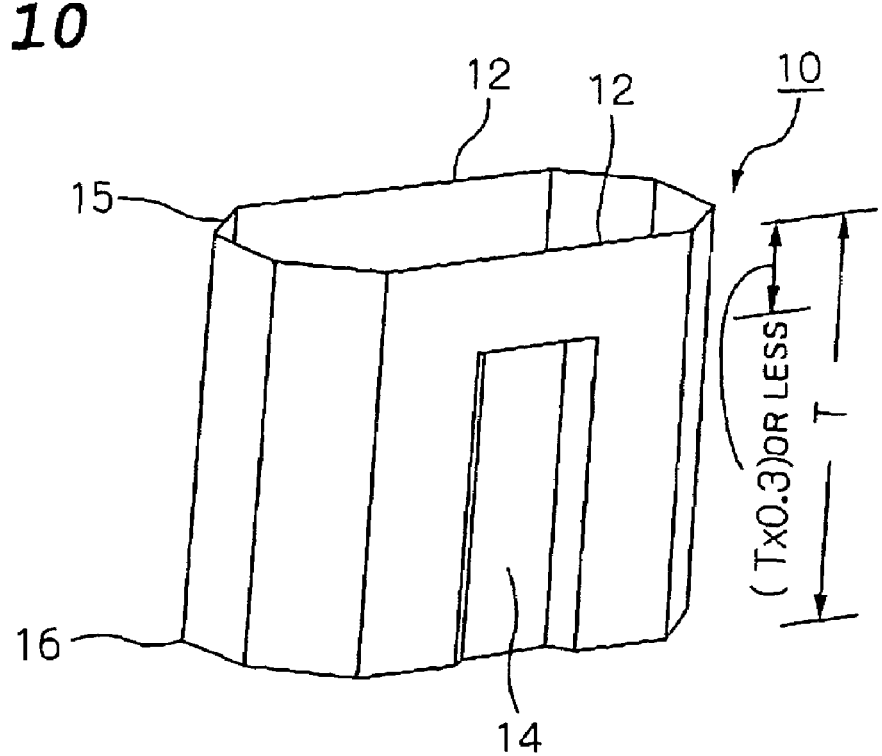
FIG. 10 is an explanatory view showing an example of the shape of a lengthwise end portion of a crash energy absorption member.

In contrast to the example shown in FIG. 8, as shown in FIG. 10, a groove 14 may be provided in a region extending from a location spaced from one end 15 by a distance (T×0.3) in the axial direction to the other end.

In this manner, in this embodiment, in order to decrease the initial largest load and to suppress a large decrease in the amount of absorbed impact energy, in all or a portion of a region from one end 15 to a position spaced therefrom by a distance (T×0.3) in the axial direction, by either (1) as shown in FIG. 10, not providing a groove 14 for stable buckling and instead making the member in this region unstable with respect to buckling and decreasing the initial largest load, or (2) as shown in FIG. 8, decreasing the transverse cross-sectional area of one end 15 to 60% of the transverse cross-sectional area of the other end 16 and gradually increasing the transverse cross-sectional area in a region having a length of at most (T×0.3) from the one end 15 and making the cross-sectional area in locations outside of this region the same as the cross-sectional area at the other end 16, the effect of decreasing the initial largest load is obtained, and a large decrease in the absorbed amount of impact energy can be suppressed.

In FIG. 8, the transverse cross-sectional area in a region beyond the distance (T×0.3) is made the same as the transverse cross-sectional area of the other end, but it does not need to be a constant cross-sectional area.

If means (1) or (2) is carried out in a region exceeding 30% of the length T of the member, buckling behaviors after initial buckling are affected, and stable buckling is no longer obtained. In other words, the groove 14 prescribed in the present invention is preferably provided in a region extending for at least 70% of the length in the axial direction measured from the end 16 which is opposite from the end 15 to which an impact load is applied to the crash energy absorption member 10.

In the examples shown in FIGS. 8 and 10, a groove 14 is continuously provided over the entirety of a region which extends for at least 70% of the length in the axial direction from the other end 16, but it is not necessary to continuously provide the groove 14 in this region, and it may be intermittently is provided in this region.

As shown in FIG. 8, with means (2) shown in FIG. 8, if the overall length in the axial direction of the crash energy absorption member is T, as long as the transverse cross-sectional area of the crash energy absorption member is smaller in at least a portion of the region up to a position separated by a distance of (T×0.3) than in other regions, the transverse cross-sectional area may decrease suddenly or gradually. In addition to these means (1) and (2), beads which act as a starting point of collapse may be continuously or intermittently formed in at least a portion of a region up to a position separated by a distance (T×0.3).

The crash energy absorption member 10 of this embodiment may be manufactured by any suitable conventional means, and there is no particular restriction on the manufacturing method. For example, a tubular body having a polygonal transverse cross section may be formed by applying one or more processing methods such as extrusion, hydroforming (liquid seal forming), or roll forming to a hollow member or applying one or more processing methods such as press bending, drawing, winding, or roll forming to a steel sheet having a prescribed thickness, and it is then subjected to joining in suitable locations to form a closed cross-sectional shape. Examples of joining methods at this time are intermittent joining methods such as spot welding, caulking, or spot frictional stirring welding, or continuous joining methods such as arc (plasma) welding, laser welding, or frictional stirring welding.

After forming, it is preferable to subject the crash energy absorption member 10 to after-treatment such as high frequency hardening, laser hardening, carburizing, or nitriding in order to further increase the strength of the crash energy absorption member 10. A higher load can be achieved by forming the crash energy absorption member 10 of this example using a tailored blank and a material useful for reduction in weight such as a thin steel sheet or an aluminum alloy.

In this manner, a crash energy absorption member 10 of this embodiment can stably buckle in the axial direction into the shape of a bellows without an increase in weight caused by the addition of a partition or an increase in plate thickness or without bending in the axial direction, so a prescribed crash energy absorbing performance can be secured. Therefore, if this crash energy absorption member 10 is applied to the above-described crash box and is mounted at the front end of a front side member by a suitable means such as joining with a connector or welding, an increase in the safety of a vehicle body and a decrease in repair costs due to near elimination of damage to the vehicle body in light collisions can be achieved with almost no accompanying increase in the weight of the vehicle body.

Second Embodiment

Next, a crash energy absorption member 10-1 according to a second embodiment will be explained.

This embodiment is similar to the first embodiment in that in a region of at least one side of a basic cross section defined as the polygon having the largest area of the polygons obtained by connecting with straight lines some of a plurality of vertices constituting a generally polygonal shape forming a closed cross section, a groove which is recessed towards the interior of the basic cross section is provided in a location not including an end point of the side.

However, in this embodiment, the remaining regions other than the above region are not formed as straight lines as in the first embodiment but are formed into a generally straight shape which projects to the outside of the basic cross section or a generally straight shape which is recessed towards the inside of the basic cross section, whereby the above-described first embodiment is further developed and improved.

In the following explanation, the explanation will concentrate on the differences from the above-described first embodiment, and an explanation of parts which are in common will be omitted when suitable.

In general, the impact performance of a crash energy absorption member is controlled by the load at which the crash energy absorption member buckles (the buckling load). This buckling load is approximately controlled by the load at which the vertices in a transverse cross section (namely, ridge lines) of the crash energy absorption member which have a high stiffness buckle.

When the load increases, compressive strains are accumulated at the vertices (or ridge lines), and compressive deformation proceeds at the vertices up to the time of buckling. When buckling subsequently occurs in these vertices, the load abruptly decreases. In order to suppress this decrease in load, it is necessary to limit the area of buckling at a vertex to a more localized small area and to increase the stress of deformation at the time of bending deformation when buckling wrinkles develop and grow in the wall surface portions formed between vertices.

In order to increase the load at the time of buckling, it is preferable for the surface portions excluding the vertices to have a shape which can promote compressive deformation without easily buckling and to enlarge the region in which compressive deformation takes place. In order to increase the stress of deformation at the time of bending deformation, if work hardening is produced in the surface portions in which buckling wrinkles develop and grow, compressive deformation up to the start of buckling can be promoted and the stress of deformation at the time of bending deformation can be increased. As a result, an abrupt decrease in the above-described load at the time of buckling can be suppressed.

In this embodiment, the reason why the remaining regions are given a shape which projects towards the outside of the outline or a shape which is recessed towards the inside of the outline is in order to increase the stiffness of the surface portions and to accumulate compressive strains in the surface portions up to the start of buckling. By increasing the buckling load and accumulating compressive strains (work hardening), the resistance to deformation at the time of formation and growth of buckling wrinkles can be increased, and a decrease in the load at the time of buckling can be suppressed.

However, depending on the transverse cross-sectional shape of the crash energy absorption member, forming the remaining regions with a generally straight shape increases the stiffness of the surface portions. As a result, there are cases in which the balance between the stiffness of the surface portions and that of the vertices is upset and buckling of the vertices becomes unstable. Accordingly, when forming the remaining regions with a generally straight shape in order to increase the stiffness of the surface portions, it is preferable to use a crash energy absorption member having a transverse cross-sectional shape in which the stiffness at the vertices is inherently high.

Figure 11:
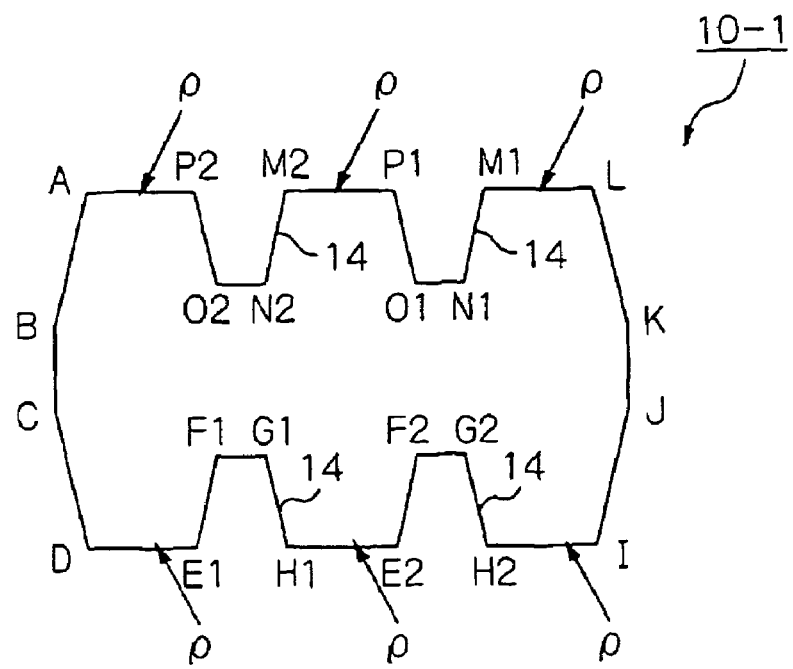
FIG. 11 is an explanatory view showing a transverse cross section of a crash energy absorption member of a second embodiment.

FIG. 11 is an explanatory view showing a transverse cross section of a crash energy absorption member 10-1 of this embodiment.

In this embodiment, FEM analysis was carried out on the crash energy absorption member 10-1 which, as shown in FIG. 11, had grooves 14, 14 between vertices (A-L, D-I) for providing high performance and stabilized buckling, and which had a transverse cross-sectional shape in which a generally straight shape having various curvatures ρ was imparted to wall surface portions (D-E1, H1-E2, H2-I, L-M1, P1-M2, and P2-A).

In this FEM analysis, a steel sheet with a thickness of 1.0 mm and a strength on the order of 590 MPa was used as a material for forming the crash energy absorption member 10-1, and the strain rate dependence was in accordance with the Cowper-Symonds model. The surface portions (D-E1, H1-E2, H2-I, L-M1, P1-M2, and P2-A) having a width of 28 mm between the vertices (A-L and D-I), which were the portions of interest shown in FIG. 11, were given a curvature so as to form a generally straight shape having a height h of 0.5-15.0 mm towards the outside or the inside, and impact performance was analyzed relative to when the surface portions (D-E1, H1-E2, H2-I, L-M1, P1-M2, and P2-A) were each formed in the shape of a straight line.

Performance was compared based on the energy absorbed at the time of collapse by 70% of the length of the member per unit weight of the member. The length T of the member used for analysis was 200 mm. Results were expressed relative to the case in which the surface portions (D-E1, H1-E2, H2-I, L-M1, P1-M2, and P2-A) were formed as straight lines. The results are compiled in the graph of FIG. 12.

Figure 12:
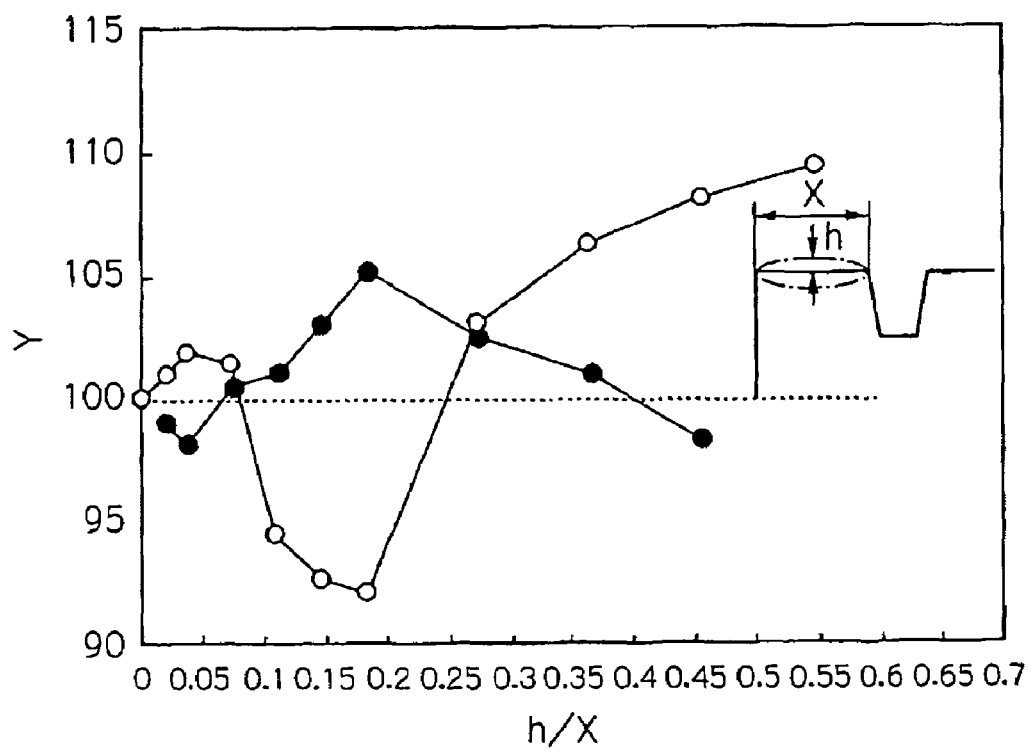
FIG. 12 is a graph showing results for the second embodiment.

The abscissa in the graph of FIG. 12 shows the ratio h/X, and the ordinate Y shows the impact performance (%) per unit weight. It is 100% when the surface portions are formed as straight lines. In this graph, solid circles show the case in which projecting shapes which projected towards the outside of the surface portions were provided, and hollow circles show the case in which recessed shapes recessed towards the inside of the surface portion were provided.

As can be seen from the graph of FIG. 12, the impact performance per unit weight can be increased by providing a shape which is recessed towards the inside in the region in which (h/X) is at most 0.075, by providing a shape which projects towards the outside in regions in which (h/X) is 0.075-0.375, or by providing a shape which is recessed towards the inside in regions in which (h/X) is at least 0.26.

In this manner, by imparting a curvature to the surface portions (D-E1, H1-E2, H2-I, L-M1, P1-M2, and P2-A), impact performance can be further improved.

Figure 13:
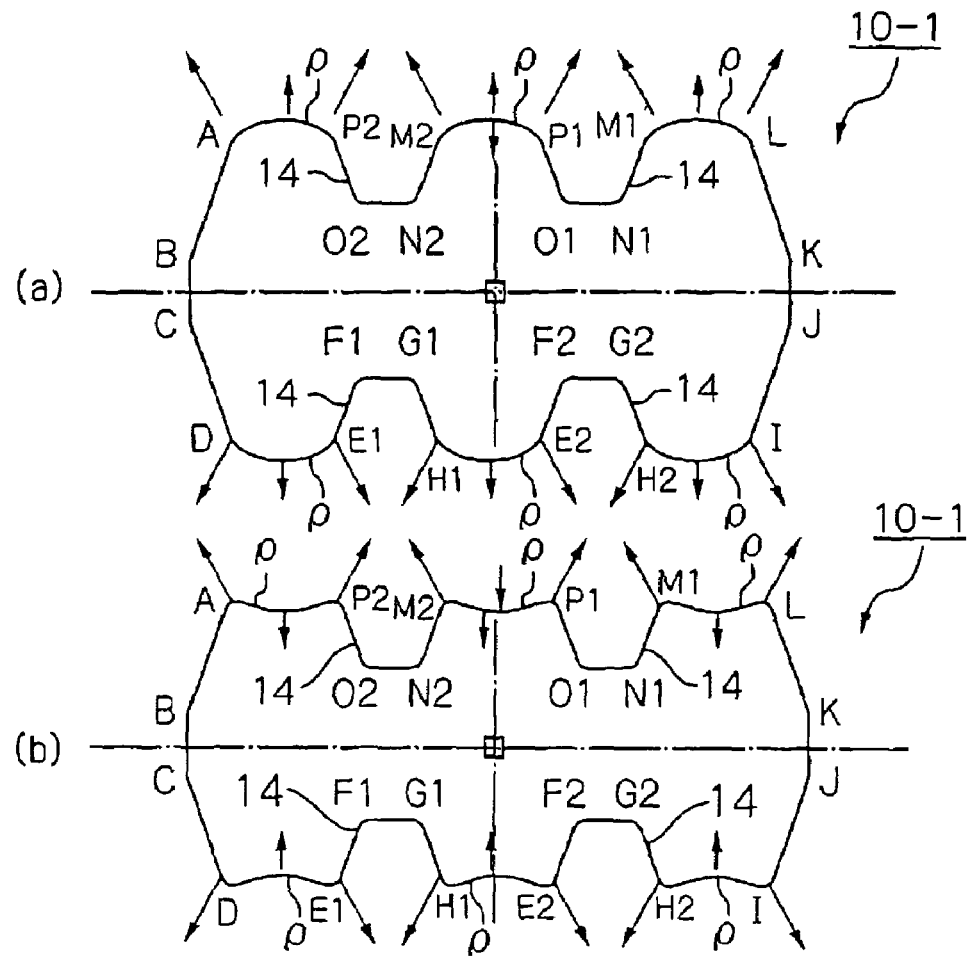
FIG. 13 is an explanatory view schematically showing the state of deflection due to elastic buckling of the vertices and the wall surface portions of a cross section when a curvature is imparted to the surface portions of a crash energy absorption member having grooves.

FIG. 13 is an explanatory view schematically showing the state of deflection due to elastic buckling at the vertices and in the surface portions when a curvature is imparted to the surface portions of crash energy absorption member 10-1 having grooves 14. FIG. 13(a) shows the case in which an outwardly projecting curvature is imparted, and FIG. 13(b) shows the case in which an inwardly recessed curvature is imparted.

As shown in FIG. 13(a), when an outwardly projecting curvature is imparted, if the imparted curvature is small, spreading of the cross section in the initial stage of a collision becomes large. Therefore, compared to the case in which surface portions (D-E1, H1-E2, H2-I, L-M1, P1-M1, and P2-A) are straight lines, elastic buckling which causes the cross section to spread outwards develops, and at the vertices (A-P2), the amount of compressive strain which acts in the axial direction decreases and the buckling load decreases.

However, when the curvature imparted to the surface portions (D-E1, H1-E2, H2-I, L-M1, P1-M2, and P2-A) is increased to a certain level, the stiffness of the surface portions (D-E1, H1-E2, H2-I, L-M1, P1-M2, and P2-A) themselves increases, and the strains due to compression increase in the surface portions (D-E1, H1-E2, H2-I, L-M1, P1-M2, and P2-A), so the buckling load increases. In addition, when the height of the projections imparted to the surface portions (D-E1, H1-E2, H2-I, L-M1, P1-M2, and P2-A) is increased so that h/X is approximately 0.075-0.375, plastic deformation of the surface portions (D-E1, H1-E2, H2-I, L-M1, P1-M2, and P2-A) is also promoted, so the resistance to deformation at the time of the growth of buckling wrinkles increases, and a decrease in the load after the occurrence of buckling is suppressed. As a result, impact performance is improved compared to the case in which the surface portions (D-E1, H1-E2, H2-I, L-M1, P1-M2, and P2-A) are straight lines.

As shown in FIG. 13(b), when an inwardly recessed curvature is imparted and the imparted curvature is small, at the initial stage of collision, the direction of elastic buckling of the vertices (A-P2) and the surface portions (D-E1, H1-E2, H2-I, L-M1, P1-M2, and P2-A) are different from each other. As a result, spreading of the vertices (A-P2) is suppressed, and larger compressive strains are accumulated. Consequently, the buckling load increases, and impact performance is improved compared to the case in which the surface portions (D-E1, H1-E2, H2-I, L-M1, P1-M2, and P2-A) are straight lines.

However, if the curvature which is imparted becomes still larger, the buckling mode which repeatedly occurs in the crash energy absorption member 10-1 as a whole becomes unstable, and impact performance decreases. This is because when the height of the depressions which are imparted to the vertices (A-P2) and the surface portions (D-E1, H1-E2, H2-I, L-M1, P1-M2, and P2-A) expressed as h/X is as large as 0.075-0.26, the progress of buckling takes place while involving buckling wrinkles which is growing. As a result, buckling which repeatedly develops becomes unstable, and this leads to a worsening in the impact performance of the crash energy absorption member 10-1 as a whole.

However, if the height of the depressions which are imparted becomes a still larger value of approximately 0.26-0.55 expressed as h/X, in the same manner as when an outwardly projecting curvature is imparted, plastic deformation of the surface portions (D-E1, H1-E2, H2-I, L-M1, P1-M2, and P2-A) is promoted, the buckling load up to the occurrence of buckling increases, and resistance to deformation at the time of growth of buckling wrinkles increases, so a decrease in the load after the occurrence of buckling can be suppressed, and the impact performance is increased compared to the case in which the surface portions (D1-E, H1-E2, H2-I, L-M1, P1-M2, and P2-A) are straight lines.

In this embodiment, by controlling the buckling strength of the vertices (A-P2) and imparting a suitable curvature to the surface portions (D-E1, H1-E2, H2-I, L-M1, P1-M2, and P2-A), impact performance can be further increased.

The optimal value of the curvature imparted to the surface portions (D-E1, H1-E2, H2-I, L-M1, P1-M2, and P2-A) is thought to vary in accordance with the cross-sectional stiffness of the crash energy absorption member 10-1 as a whole and the stiffness of the surface portions (D-E1, H1-E2, H2-I, L-M1, P1-M2, and P2-A), i.e., the length of the surface portions (D-E1, H1-E2, H2-I, L-M1, P1-M2, and P2-A).

Based on the relationship with the dimensions of other members, there exists an upper limit on the cross-sectional area of a crash energy absorption member 10-1 for the body of an automobile which is the object of the crash energy absorption member 10-1 of this embodiment. It is also necessary to take it into consideration to form a tool reference plane for joining other members.

For this reason, the height h is preferably at most 50 mm.

EXAMPLE 1

Next, the present invention will be explained in further detail while referring to examples.

In this example, a collision test was carried out in the following manner in order to verify the results of a crash energy absorption member of the above-described first embodiment.

Figure 14:
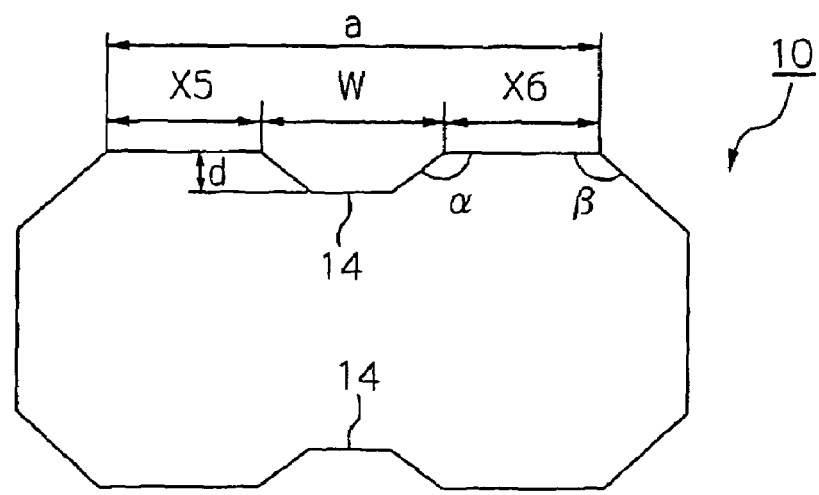
FIG. 14 is an explanatory view showing one example of the cross-sectional shape of the crash energy absorption member in Example 1.

A high tensile strength steel sheet with a sheet thickness of 1.6 mm and a strength on the order of 590 MPa was subjected to bending to form a polygonal cross section, and the abutting surfaces were welded to form a crash energy absorption member 10 comprising a tubular body having the transverse cross-sectional shape shown in FIG. 14. As shown in FIG. 14, the length of one section of a side which was divided into two sections by a groove 14 formed therein was X5, the length of the other section was X6, and the depth of the groove was d.

A weight body having a weight of 200 kgf was dropped in free fall from a height of 11.9 m onto the crash energy absorption member 10. It impacted the crash energy absorption member 10 at a speed of 55 km per hour in the axial direction, and the resistance to deformation of the crash energy absorption member 10 at the time of collapse in the axial direction was measured with a piezoelectric load cell. The length T of the member was 180 mm, and the absorbed energy at a collapse by 130 mm was compared.

In a collision test in which this crash energy absorption member 10 was mounted as a crash box on the front end portion of a front side member of an automobile, the crash energy absorption member 10 first collapsed, and then the front side member collapsed. Accordingly, the above test correlates well with the phenomenon observed in the first half of such collision test.

In Run No. 1 through Run No. 3, the width a shown in FIG. 14 was 130 mm, a groove was provided in each of the upper and lower sides, internal angle α was made 135°, and internal angle β was made 106°.

In Run No. 4, the shape of Run No. 1 was modified such that internal angle α was made 100°, which was smaller than internal angle β (106°). In Run No. 5, the width a was made 130 mm, two grooves were provided in each of the upper and lower sides, and internal angle α was made 107°.

In Run No. 6, the shape of Run No. 1 was modified such that a groove 14 was not provided in a region extending for a length of 30 mm in the axial direction from one end to which an impact load was applied.

In Run No. 7, the shape of Run No. 1 was modified such that the dimensions of the cross section were reduced to 0.77 times their values in Run No. 1 so that the cross-sectional area at one end to which an impact load was applied became 0.6 times the cross-sectional area in Run No. 1. The shape of this end and the cross-sectional shape of Run No. 1 were smoothly joined in a region with a length of 30 mm in the axial direction, and the remaining portion with a length of 150 mm had the same shape as in Run No. 1.

In Run No. 8, he shape of Run No. 1 was modified such that a groove was not provided in a region extending for a length of 80 mm in the axial direction from one end to which an impact load was applied.

In Run No. 9, a regular octagon in which each side had a length of 35 mm was modified by increasing the length of two opposing sides to 119.5 mm to form a shape having a cross section with a flatness of 2.0.

The conditions and representative dimensions are shown in Table 1.

TABLE 1

(Unit of length: mm)

| Run No. | Content | Groove width W | Groove depth d | Length of side X5 | Length of side X6 | Length of side X7 | Internal angle α (°) | Internal angle β (°) | Length of portion without groove | Length where cross section decreases |
|---|---|---|---|---|---|---|---|---|---|---|
| 1 | 1 proper groove in flat octagon | 60 | 11.5 | 35 | 35 | | 135 | 106 | | |
| 2 | 1 wide groove in flat octagon | 118 | 11.5 | 6.0 | 6.0 | | 135 | 106 | | |
| 3 | 1 narrow groove in flat octagon | 6.0 | 6.0 | 62 | 62 | | 135 | 106 | | |
| 4 | 1 groove in flat octagon | 60 | 11.5 | 35 | 35 | | 100 | 106 | | |
| 5 | 2 proper grooves in flat octagon | 25 each | 15 each | 26.6 | 26.6 | 26.6 | 107 | 106 | | |
| 6 | add a region without groove to Run No. 1 | 60 | 11.5 | 35 | 35 | | 135 | 106 | 30 | |
| 7 | decrease cross- | 60 | 11.5 | 35 | 35 | | 135 | 106 | | 30 |

TABLE 1-continued (Unit of length: mm)

| Run No. | Content | Groove width W | Groove depth d | Length of side X5 | Length of side X6 | Length of side X7 | Internal angle α (°) | Internal angle β (°) | Length of portion without groove | Length where cross section decreases |
|---|---|---|---|---|---|---|---|---|---|---|
| | sectional area of end of Run No. 1 | | | | | | | | | |
| 8 | increase length of region without groove in Run No. 6 | 60 | 11.5 | 35 | 35 | | 135 | 106 | 80 | |
| 9 | flat octagon with no groove | | | | | | | 135 | | |

The initial largest load and the energy absorbed up to a collapse to 70% of the length of the member are shown in Table 2.

TABLE 2

| Run No. | Initial largest load (kN) | Absorbed energy at 70% collapse (kJ) |
|---|---|---|
| 1 | 350 | 19.6 |
| 2 | 349 | 15.2 |
| 3 | 330 | 13.5 |
| 4 | 361 | 15.0 |
| 5 | 441 | 20.1 |
| 6 | 251 | 20 |
| 7 | 172 | 18.2 |
| 8 | 253 | 16.8 |
| 9 | 323 | 13.0 |

From the results shown in Table 2, it can be seen that by providing a suitable groove, a crash energy absorption member can be given a transverse cross-sectional shape which is a flat polygon which could not be used in the past, and that by varying the shape in a suitable region at one end to which an impact load is applied, a decrease in the initial largest load can be achieved.

EXAMPLE 2

In this example, the following collision test was carried out in order to verify the results of a crash energy absorption member 10-1 of the second embodiment.

The shape of a crash energy absorption member used for verification was a model of a crash energy absorption member having the transverse cross-sectional shape shown in FIG. 11. A curvature p was imparted to the wall surface portions (D-E1, H1-E2, H2-I, L-M1, P1-M2, and P2-A) at the locations shown by arrows in FIG. 11 and performance was compared. The length T of the member in this model was 200 mm. The thin steel sheet used in this model had a sheet thickness of 1.0 mm and a tensile strength on the order of 590 MPa.

A test of impact performance was carried out by dropping a weight having a weight of 200 kgf in free fall from a height of 11.9 mm so as to allow it to impact with the crash energy absorption member with a speed of 55 km per hour in the axial direction. The resistance to deformation at the time of collapse in the axial direction of the crash energy absorption member was measured by a piezoelectric load cell mounted thereon, and crash energy absorbing performance was evaluated based on the amount of energy absorbed up to a collapse by 70% of the length of the member.

The shape which was imparted and the energy absorbed up to 70% collapse in the test are shown in Table 3.

TABLE 3

| Example No. | Width of surface (mm) | Direction of imparted curvature | h/X | Energy absorbed at 70% collapse (kJ) |
|---|---|---|---|---|
| Inventive Run 1 | 28 | outer | 0.172 | 14.12 |
| Inventive Run 2 | 28 | inner | 0.431 | 14.31 |
| Inventive Run 3 | 28 | inner | 0.045 | 14.52 |
| Comparative Run | 28 | none | 0.00 | 13.94 |

As shown in Table 3, in the inventive runs according to the present invention, by imparting a curved shape to the wall surface portions, the crash energy absorbing performance was improved compared to the comparative run having a straight line shape.

In the inventive runs, in the course of collapse of a crash energy absorption member which collapsed in the axial direction at the time of a collision, excellent crash energy absorbing performance was obtained by increasing the accumulated compressive strains in the axial direction and increasing the deformation stress at the time of forming buckling wrinkles in the surface portions which were locations other than vertices.

Therefore, it is preferable to impart a shape (curvature) to the wall surface portions and increase the stiffness of these surface portions.

If laser hardening carburizing, or nitriding is carried out on a crash energy absorption member of the examples of the present invention, or if a tailored blank which makes disposition of a suitable material possible is used or if a thin steel sheet for reducing weight or a material other than an aluminum alloy is used to form a crash energy absorption member of these examples, an even higher load can be achieved.

INDUSTRIAL APPLICABILITY

According to the present invention, a crash energy absorption member can be provided which can secure a prescribed amount of shock absorption by stably buckling in the axial direction into the shape of a bellows without an increase in weight due to the addition of a partition or due to an increase in plate thickness and without bending in the axial direction.

The invention claimed is:

1. A crash energy absorption member formed from a tubular body for absorbing impact energy by buckling when it receives an impact load in the axial direction from one end in the axial direction, characterized in that it has a transverse cross-sectional shape along at least a portion in the axial direction which is a closed cross section having a generally polygonal shape and which has no flange on the outside of the closed cross section, and in a region of at least one side of a basic cross section defined as the polygon having the largest area of polygons obtained by connecting with straight lines a portion of a plurality of vertices constituting the generally polygonal shape, at least one groove which is recessed towards the inside of the basic cross section is provided in a location other than at an end point of the side, and remaining regions of the side outside the above-mentioned region of the side having the at least one groove have a generally straight shape.

2. A crash energy absorption member as set forth in claim 1 wherein the generally straight shape is a straight line.

3. A crash energy absorption member as set forth in claim 1 wherein when the width of the side having the at least one groove is a, the opening width of one groove is Wi, the plate thickness of the crash energy absorption member is t, a number of one or more grooves provided in the side is n, and the width of remaining (n+1) regions which are separated by the n grooves provided in the side is Xj, then the following Equations 1 and 2 are satisfied.

$$4t < W_i < 65t \quad i = \text{a natural number from 1 to n} \tag{1}$$

$$4t < X_j < 65t \quad j = \text{a natural number from 1 to } (n+1) \tag{2}$$

wherein $\Sigma W_i + \Sigma X_j = a$, $\Sigma W_i$ is a total of the opening widths Wi of the one or more grooves formed in the side of width a, the opening width Wi being the distance between two intersections between the side of width a and an outline of the groove, and $\Sigma X_j$ is a total of the widths Xj.

4. A crash energy absorption member as set forth in claim 1 wherein when a total length in the axial direction of the crash energy absorption member is T, the at least one groove is provided in a region extending from a position spaced from one end of the crash energy absorption member by a distance (T×0.3) in the axial direction to an opposite end.

5. A crash energy absorption member as set forth in claim 1 wherein a total length in the axial direction of the crash energy absorption member is T, a transverse cross-sectional area of the crash energy absorption member in at least a portion of a region from one end of the crash energy absorption member to a position spaced therefrom in the axial direction by a distance (T×0.3) is smaller than in other portions.

6. A crash energy absorption member as set forth in claim 1 wherein an internal angle (α) of the intersection between the side of width a containing the at least one groove and an outline of the groove is greater than or equal to an internal angle (β) at the end point of the side.

7. A crash energy absorption member as set forth in claim 1 wherein a cross-sectional shape of the at least one groove is a trapezoid, a curved shape, a triangle, a quadrilateral, or a shape which is a combination of at least two of these shapes.

8. A crash energy absorption member as set forth in claim 1 which buckles into a bellows shape due to the at least one groove and the remaining regions alternatingly deforming in opposite directions when the crash energy absorption member receives the impact load.

9. A crash energy absorption member as set forth in claim 2, wherein when the width of the side having the at least one groove is a, the opening width of one groove is Wi, the plate thickness of the crash energy absorption member is t, a number of one or more grooves provided in the side is n, and the width of remaining (n+1) regions which are separated by the n grooves provided in the side is Xj, then the following Equations 1 and 2 are satisfied.

$$4t < W_i < 65t \quad i = \text{a natural number from 1 to n} \tag{1}$$

$$4t < X_j < 65t \quad j = \text{a natural number from 1 to } (n+1) \tag{2}$$

wherein $\Sigma W_i + \Sigma X_j = a$, $\Sigma W_i$ is a total of the opening widths Wi of the one or more grooves formed in the side of width a, the opening width Wi being the distance between two intersections between the side of width a and an outline of the groove, and $\Sigma X_j$ is a total of the widths Xj.

10. A crash energy absorption member as set forth in claim 3 wherein when a total length in the axial direction of the crash energy absorption member is T, the at least one groove is provided in a region extending from a position spaced from one end of the crash energy absorption member by a distance (T×0.3) in the axial direction to an opposite end.

11. A crash energy absorption member as set forth in claim 3 wherein a total length in the axial direction of the crash energy absorption member is T, a transverse cross-sectional area of the crash energy absorption member in at least a portion of a region from one end of the crash energy absorption member to a position spaced therefrom in the axial direction by a distance (T×0.3) is smaller than in other portions.

12. A crash energy absorption member as set forth in claim 3 wherein an internal angle (α) of the intersection between the side of width a greater than or equal to an internal angle (β) at the end point of the side.

13. A crash energy absorption member as set forth in claim 2 which buckles into a bellows shape due to the at least one groove and the remaining regions alternatingly deforming in opposite directions when the crash energy absorption member receives the impact load.

14. A crash energy absorption member as set forth in claim 3 which buckles into a bellows shape due to the at least one groove and the remaining regions alternatingly deforming in opposite directions when crash energy absorption member receives the impact load.

* * * * *